Aug. 8, 1944. G. S. WING 2,355,580

HIGH SHEAR RIVET

Filed Oct. 25, 1943

INVENTOR.
George S. Wing
BY Carlos G. Stratton
ATTORNEY

Patented Aug. 8, 1944

2,355,580

UNITED STATES PATENT OFFICE 2,355,580

HIGH SHEAR RIVET

George S. Wing, Hermosa Beach, Calif., assignor to North American Aviation, Inc., Inglewood, Calif., a corporation of Delaware Application October 25, 1943, Serial No. 507,546

5 Claims. (Cl. 85—37)

This invention relates to securing devices of the general class including bolts and rivets and has as its object to provide a device particularly suitable for connecting together sheets or plates in a manner such as to withstand high shear strains and considerable tension loads and yet capable of being applied with a minimum expenditure of time and effort.

More specifically, the invention aims to provide a securing device that can be applied as rapidly and easily as the conventional upsettable rivet and yet, in other respects, has the advantages of a bolt and nut combination; for example, in high resistance to shear stresses.

Another object of the invention is to provide a securing device which is considerably less expensive in construction than, although possessing the advantages of, the conventional bolt and nut combination.

A further object is to provide a securing device which can be applied as readily as, and in a manner comparable to conventional riveting, yet with a much greater uniformity of result, avoiding the poor results commonly met with in riveting, such as "clinching" (off-center heads) and "flashing" (bulging of the body of the rivet between the surfaces that are intended to be clamped together) and also avoiding some of the shortcomings of the bolt and nut combination, such as weakening through excessive wrench pressure, working loose because of insufficient wrench pressure, and being too short, so that some of the threaded (and weaker) portion of the bolt is included within the load-bearing area (between the head and nut), or being too long, so that some of the unthreaded portion of the bolt enters the nut, resulting in damage to the threads, unless washers are inserted under the bolt head to accommodate the extra length and provide adequate bearing.

The invention further contemplates the provision of a securing device which can be removed without damaging the holes in the parts that were secured together thereby.

My invention also has for its objects to provide such devices that are convenient in use, economical of manufacture, relatively simple, and of general superiority and serviceability.

The invention also comprises novel details of construction and novel combinations and arrangements of parts, which will more fully appear in the course of the following description. However, the drawing merely shows and the following description merely describes embodiments of the present invention, which are given by way of illustration or example only.

This application is in part a continuation of my co-pending application Serial No. 452,999, filed July 31, 1942.

In the drawings, like reference charactres designate similar parts in the several views.

The conventional upsettable rivet, the fast-applying characteristics of which this invention aims to match, is of a relatively soft metal adapted for cold upsetting, e. g., aluminum alloy. Such a metal has a comparatively low resistance to shearing stresses, and it is common practice where high shear loads must be borne, to utilize, in place of such rivets, bolts, washers and self-locking nuts. The present invention provides a practical and advantageous substitute for such bolts and their accessories, its advantages including reduction both in cost and weight, and time required for assembly.

Figure 2:
Fig. 2 is a longitudinal sectional view through the malleable, upsettable collar.
Figure 1:
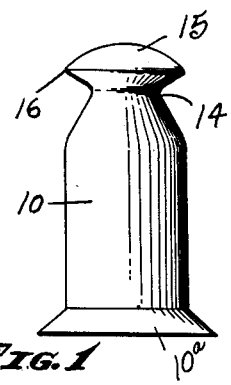
Fig. 1 is an elevation of the non-upsettable rivet pin.
Figure 3:
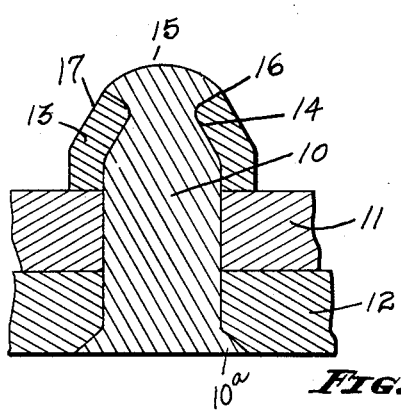
Fig. 3 is a vertical sectional view through a riveted connection as it appears in use.

In order to achieve high resistance to shear, the invention provides a rigid alloy steel pin 10 (Fig. 1) designed to fit snugly in openings in the sheets or plates 11 and 12 that are to be secured together, and being too hard to be readily upsettable itself. The pin has a preformed head 10a for engaging one of the parts 11, 12 and is secured by a malleable collar 13 (Fig. 2) which is deformed into an annular groove 14 in the pin so as to produce a work-engaging abutment or head, as shown in Fig. 3, wherein an outer conical surface 17 of the collar 13 merges with a rounded end surface 15 of the pin to form a continuous, dome-shaped surface.

Figure 4:
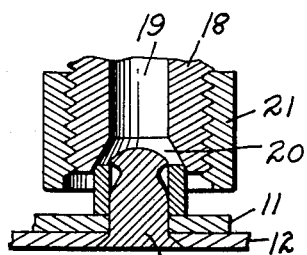
Figs. 4 and 5 are vertical sectional views illustrating the rivet and adjacent portions of the setting tool, respectively in starting position and at the completion of the rivet setting.
Figure 5:
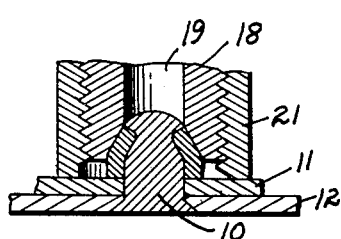

The application of the securing device is illustrated in Figs. 4 and 5, Fig. 4 showing a rivet 10 and a collar 13 assembled with reference to a pair of plates or sheets 11 and 12, and, in operative relation thereto, a buck or riveting head 18 having an axial bore 19 terminating, at its lower end, in a flared surface 20 for contracting the collar 13 upon application of axial pressure thereto. Fig. 5 shows the same parts after the collar 13 has been contracted into the groove 14.

Figure 6:
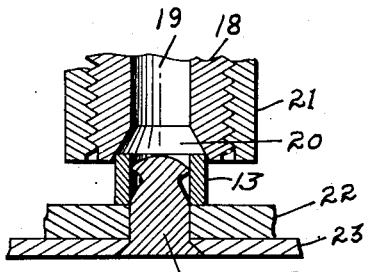
Figs. 6 and 7 are respectively similar views to Figs. 4 and 5, with the setting tool adjusted to compensate for a less protuberant rivet pin.
Figure 7:
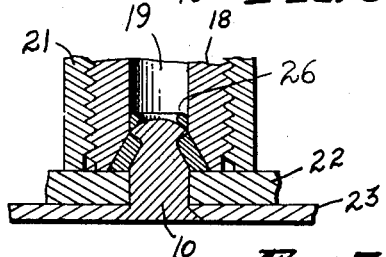

Small variations in thickness of the parts that are to be secured together are compensated for without varying the smooth dome-shaped head that is attained in the setting operation. This is accomplished by providing for shearing off or extruding a portion of the collar where the collar is of greater length than the distance from the edge of the rounded end 15 of the rivet, to the face of the nearest plate or sheet. This is shown in Figs. 6 and 7, wherein the plates 22 and 23 that are to be secured together are of greater aggregate thickness than the parts 11 and 12 and as a result the outer end of the collar 13, in the initial assembly, as shown in Fig. 6, projects beyond the end of the pin 10. This projecting portion is sheared off in the setting operation, as shown in Fig. 7. To accomplish the shearing, the pin 10 is provided with a shearing edge 16, defined at the intersection of its outer end surface 15 and the surface of the groove 14. The surplus portion of the collar is pinched off between the shearing edge and the flared surface 20 as the latter forces the collar inwardly. The abutment head as thus formed on the securing element (see Fig. 7) has a continuous domed surface the same as that shown in Fig. 3 except that the collar is not as long, as a result of the trimming action.

Since it is desirable to continue to apply buck pressure only until such movement as is necessary to allow the inner bore 19 to complete its cooperative action with the rivet pin shearing edge 16, the buck 18 may be advantageously utilized with an axially adjustable surrounding sleeve 21 to thus engage the work and effect a desirable limitation of buck movement toward the work, adjustment of said sleeve being plainly indicated in Figs. 4 to 7 inclusive and being dependent upon the length of the pin projecting at one side of the work and thus upon the thickness of the connected plates or sheet metal sections 11 and 12.

It is to be understood, however, that the sleeve 21 may be eliminated or the sleeve 21 and buck 18 may be integral and therefore fixed with relation to each other.

The securing device may be readily removed, as by splitting the collar into two or more sections, removing the sections, and then withdrawing the pin.

Figures 8, 9:
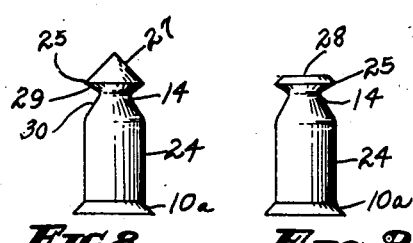
Figs. 8 and 9 are elevations of modified constructions of rivet pins.

Fig. 8 shows a rivet pin 24 with a flaring head 10a and a circumferential groove 14 adjacent opposite ends. The shearing edge 25 is capped by a conical end 27. Fig. 9 shows a similar construction, except that the end is a truncated cone 28.

In all of the forms herein, it is preferred that the diameter of the cutting edge 16 or 25 shall be slightly smaller than the diameter of the shank 10 or 24, such as two thousandths, in order that the rivet pin may be inserted in alined plate openings with a light drive fit without scoring the shearing edge 16 or 25.

It has hitherto been proposed to form a securing device by compressing a soft stainless steel collar into a groove of uniform curvature in axial section. Where the groove is thus of uniformly arcuate shape the resistance to tension loads is adversely affected by the wedging action of the pin, tending to spread the collar so as to permit the pin to pull loose from the collar. This condition necessitates the use of a material, such as chrome steel, which will develop considerable tensile strength under cold working, but this characteristic in turn creates difficulty in securing complete contact between the collar and the groove.

In contrast to such prior proposal, the present invention provides an arrangement wherein adequate resistance to tension loads may be attained with the use of a collar of a soft metal such as, for example, aluminum, and wherein, in addition, compression stresses are set up in the collar in the setting thereof, which function to draw tightly together the parts secured by the rivet.

To this end, the groove is formed with an abutment surface 29 which, in axial section, forms an angle of such obtuseness relative to the axis of the pin, that tension loads will be transmitted from the pin to the collar in the form of relatively direct end thrust between the surface 29 and the end of the collar, the tendency of the collar to spread under wedging action of the pin within the collar being reduced to a minimum. In the embodiment shown, which has been found by test to be highly satisfactory, the abutment surface 29 is disposed at approximately a right angle to the other surface 30 of the groove, and at an angle of substantially more than 45° to the axis of the pin.

Since the abutment surface 29 is disposed at an angle of approximately 93° to the adjacent portion of the inner face of the collar, when the collar is compressed into the groove 14, and is substantially parallel to the direction of contracting movement of the outer end of the collar, it will offer low resistance to such contracting movement and, accordingly, will permit the collar to become seated snugly against the conical surface 30 without any considerable change in the cross sectional shape of the collar other than the bending inwardly thereof. However, the collar tends to elongate axially as a result of the contraction, and consequently the ends of the collar will be wedged under compression against the abutment surface 29 and the plate or sheet 11 respectively, thus drawing the sheets or plates 11 and 12 tightly together. This is made possible by the arrangement of the abutment surface 29 at such an angle as to permit the setting up of direct end thrust between this surface and the end surface of the collar without slippage occurring between these surfaces.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A device for establishing a riveted joint between a pair of members having aligned holes therein, said device comprising a substantially non-upsettable rivet pin having a shank extending through said holes, having a head at one end adapted to engage one of said members, and having at its other end a shearing edge and an undercut annular shoulder subtending, with the axis of the pin, an angle greater than 45°, and a malleable collar adapted to encircle said shank and to bear at one end against the other of said members, the other end of said collar being adapted to be contracted into said groove and to bear against said shoulder with an abutting engagement such that tensile stress on said pin and compression in said collar will have a relatively large axial component and a relatively small radial component.

2. A device for forming a riveted joint between a pair of members having aligned holes therein, said device comprising a substantially non-upsettable rivet pin having a shank adapted to extend through said holes, having a head at one end thereof adapted to engage one of said members, and having at its other end a shearing edge and an undercut annular shoulder subtending, with the axis of the pin, an angle greater than the angle subtended with said axis by a line extending from the bottom of the groove to the extremity of the groove opposite said abutment surface, and a malleable collar adapted to encircle said shank and to bear at one end against the other of said members, the other end of said collar being adapted to be contracted into said groove and to bear against said shoulder with an abutting engagement such that tensile stress on said pin and compression in said collar will have a relatively large axial component and a relatively small radial component.

3. A high shear load sustaining rivet comprising a substantially non-upsettable rivet pin having a shank and a head at one end thereof, and having adjacent its other end an undercut, annular shoulder terminating, adjacent said other end in a shearing edge, for use in connection with a malleable collar adapted to be radially contracted for compressive engagement between said shoulder and one of a plurality of members through which said pin extends with said head in engagement with another of said members, and to have excess material of its outer end sheared off against said shearing edge during such contraction, said shoulder being disposed at a greater angle with reference to the axis of the groove than the angle defined between the axis and a line drawn from the bottom of the groove to the extremity of the groove opposite said shearing edge, whereby to provide abutment for the sheared end of said collar such that tensile stress on said pin and compression in said collar will have a relatively large axial component and a relatively small radial component, and said shoulder and the surface of said other end of the pin subtending between them an angle of adequate acuteness to provide said shearing edge.

4. A high shear load sustaining rivet comprising a substantially non-upsettable rivet pin having a shank and a head at one end thereof, and having adjacent its other end, an undercut, annular shoulder terminating, adjacent said other end in a shearing edge, for use in connection with a malleable collar adapted to be radially contracted for compressive engagement between said shoulder and one of a plurality of members through which said pin extends with said head in engagement with another of said members, and to have excess material of its outer end sheared off against said shearing edge during such contraction, said shoulder subtending, with the axis of the pin, an angle greater than 45°, whereby to provide abutment for the sheared end of said collar so that tensile stress on said pin and compression in said collar will have a relatively large axial component and a relatively small radial component, said shoulder and the surface of said other end of the pin subtending between them an angle of adequate acuteness to provide said shearing edge.

5. A rivet pin as defined in claim 4 wherein said shearing edge is of slightly smaller diameter than said pin.

GEORGE S. WING.